UNITED STATES PATENT OFFICE.

CHARLES N. WAITE, OF MEDFORD, MASSACHUSETTS.

PROCESS OF DISTILLING LACTIC ACID.

SPECIFICATION forming part of Letters Patent No. 321,925, dated July 7, 1885.

Application filed May 16, 1884. (No specimens.)

*To all whom it may concern:*

Be it known that I, CHARLES N. WAITE, of Medford, in the county of Middlesex and State of Massachusetts, have invented certain Improvements in Processes of Distilling Lactic Acid, of which the following is a specification.

My process relates to an improvement in the purification of lactic acid produced by fermentation. The acid exists in fermented liquors, together with many other substances, whose removal is difficult or impossible by the ordinary methods of crystallization with chemical bases. It is well known that lactic acid is volatile only at high temperatures, (200° to 250° centigrade,) and then only with the destruction and waste of much of the acid. I have discovered that lactic acid is carried by steam at lower temperatures, (100° to 180° centigrade,) with little or no loss of acid by decomposition. In a partial vacuum the acid is carried over by steam at tempertures between 80° centigrade to 135° centigrade.

My process consists in distilling lactic acid, either in a partial vacuum or at the ordinary pressure of the atmosphere, in a suitable still or vessel by the aid of free steam. The steam may be introduced continuously into the still from a generator through a coil provided with a number of fine openings, or the steam may be generated within the still from water introduced for this purpose. The steam passing from the still carries with it a small proportion of pure lactic acid, and is passed, with such acid, through a suitable condenser, where it is condensed into a dilute solution of pure lactic acid, which may be afterward concentrated to any desired degree by evaporation. In case the steam is generated within the still, the water from which it is formed may be introduced either in a continuous fine stream, so that the steam will be continuously supplied, or the water may be added in bulk from time to time as the progress of the distillation may require, the supply of steam being interrupted by each addition of water. I prefer the continuous supply of steam, however, because the distillation of lactic acid with an intermittent or interrupted supply of steam converts the lactic acid into anhydrous lactic acid or lactide, which cannot be distilled in a state of purity. By the continuous supply of steam the formation of lactide is prevented, and a continuous distillation of pure lactic acid takes place.

I claim—

1. The process of distilling and purifying lactic acid by the aid of free steam, substantially as set forth.

2. The process of distilling and purifying lactic acid, the same consisting in subjecting the crude lactic acid to contact with steam in a suitable still or vessel, thereby causing the steam to take up the pure lactic acid, and then condensing the steam, as set forth.

In testimony whereof I have signed my name to this specification, in the presence of two subscribing witnesses, this 5th day of May, 1884.

CHARLES N. WAITE.

Witnesses:
C. F. BROWN,
A. L. WHITE.